ized Patent

(12) United States Patent
Woo et al.

(10) Patent No.: US 12,148,874 B2
(45) Date of Patent: Nov. 19, 2024

(54) RECHARGEABLE BATTERY

(71) Applicant: Samsung SDI Co., Ltd., Yongin-si (KR)

(72) Inventors: Byongchul Woo, Yongin-si (KR); Seungjun Myoung, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 16/329,409

(22) PCT Filed: Aug. 11, 2017

(86) PCT No.: PCT/KR2017/008720
§ 371 (c)(1),
(2) Date: Feb. 28, 2019

(87) PCT Pub. No.: WO2018/048109
PCT Pub. Date: Mar. 15, 2018

(65) Prior Publication Data
US 2019/0198851 A1    Jun. 27, 2019

(30) Foreign Application Priority Data

Sep. 9, 2016  (KR) .................. 10-2016-0116729

(51) Int. Cl.
*H01M 10/04*     (2006.01)
*H01M 10/42*     (2006.01)
*H01M 50/579*    (2021.01)

(52) U.S. Cl.
CPC ....... *H01M 10/0431* (2013.01); *H01M 10/42* (2013.01); *H01M 50/579* (2021.01)

(58) Field of Classification Search
CPC . H01M 2/20–347; H01M 10/04–0431; H01M 50/579
See application file for complete search history.

(56) References Cited

U.S. PATENT DOCUMENTS

2006/0003221 A1   1/2006 Yeo
2006/0093922 A1 * 5/2006 Kim ................... H01M 2/0275
                                              429/251
(Continued)

FOREIGN PATENT DOCUMENTS

CN    100483800 C    4/2009
CN    103259049 A    8/2013
(Continued)

OTHER PUBLICATIONS

EPO Machine English Translation of KR 20150034965 originally published to Young Wook Kim on Apr. 6, 2015 (Year: 2015).*
(Continued)

*Primary Examiner* — Cynthia H Kelly
*Assistant Examiner* — Niara Trant
(74) *Attorney, Agent, or Firm* — Lewis Roca Rothgerber Christie LLP

(57) ABSTRACT

A rechargeable battery according to an exemplary embodiment of the present invention includes: an electrode assembly which is wound and includes a first electrode, a second electrode, and a separator interposed between the first electrode and the second electrode; a casing which accommodates the electrode assembly; a first electrode tab which is connected to a non-coated portion of the first electrode; a second electrode tab which is connected to a non-coated portion of the second electrode; and a first insulating tape which is positioned at a winding start portion of the electrode assembly and attached to the non-coated portion of the first electrode so as to at least cover a center of a first curved portion which is curvedly formed as the electrode assembly is wound.

9 Claims, 6 Drawing Sheets

(56) References Cited

U.S. PATENT DOCUMENTS

| | | |
|---|---|---|
| 2008/0280197 A1 | 11/2008 | Machida |
| 2009/0297929 A1* | 12/2009 | Uchida ............. H01M 10/0431 |
| | | 429/94 |
| 2009/0317713 A1 | 12/2009 | Kim et al. |
| 2010/0285342 A1 | 11/2010 | Lee et al. |
| 2011/0027636 A1 | 2/2011 | Lee et al. |
| 2012/0177963 A1 | 7/2012 | Lee et al. |
| 2015/0104684 A1 | 4/2015 | Kim et al. |
| 2016/0126585 A1 | 5/2016 | Choi et al. |
| 2016/0218386 A1 | 7/2016 | Park et al. |
| 2016/0260998 A1 | 9/2016 | Eo et al. |
| 2019/0140241 A1* | 5/2019 | Takahashi ............... B60L 50/64 |

FOREIGN PATENT DOCUMENTS

| | | | |
|---|---|---|---|
| CN | 103904368 | A | 7/2014 |
| CN | 104576977 | A | 4/2015 |
| CN | 205828578 | U * | 12/2016 |
| EP | 3 048 656 | A1 | 7/2016 |
| EP | 3 065 204 | A1 | 9/2016 |
| JP | 2005-222884 | A | 8/2005 |
| JP | 2006-12808 | A | 1/2006 |
| JP | 2012-049089 | A | 3/2012 |
| KR | 10-2001-0038814 | A | 5/2001 |
| KR | 10-0857017 | B1 | 9/2008 |
| KR | 10-0911999 | B1 | 8/2009 |
| KR | 10-2009-0132500 | A | 12/2009 |
| KR | 10-0982003 | B1 | 9/2010 |
| KR | 10-2011-0007785 | A | 1/2011 |
| KR | 10-1285745 | B1 | 7/2013 |
| KR | 10-2015-0034965 | A | 4/2015 |
| KR | 10-1584830 | B1 | 1/2016 |

OTHER PUBLICATIONS

Polyethylene (PE). Polyethylene (PE) Plastic: Properties, Uses & Application. (n.d.). https://omnexus.specialchem.com/selection-guide/polyethylene-plastic. (Year: 2021).*

Dielectric Manufacturing. (Jun. 2, 2021). Material Properties of Thermoplastic Kapton—Unfilled Polyimide. Dielectric Manufacturing. https://dielectricmfg.com/knowledge-base/kapton/. (Year: 2021).*

The Definitive Guide to Polypropylene (PP) . Polypropylene (PP) Plastic: Types, Properties, Uses & Structure Info. (n.d.). https://omnexus.specialchem.com/selection-guide/polypropylene-pp-plastic. (Year: 2021).*

Google English Machine Translation of CN205828578 originally published to Cai Jiacai on Dec. 21, 2016 (Year: 2016).*

Extended European Search Report for corresponding European Patent Application No. 17848993.6, dated Apr. 9, 2020, 7 pages.

Korean Office action for Application No. 10-2016-0116729, mailed Dec. 1, 2020, 5 pages.

European Office action for Application No. 17 848 993.6, mailed Oct. 14, 2021, 6 pages.

Chinese Notice of Allowance for Application No. 201780055055.4, mailed Nov. 3, 2021, 2 pages.

Chinese Office action for Application No. 201780055055.4, mailed May 31, 2021, 16 pages.

European Office action for Application No. 17848993.6, mailed Jul. 12, 2023, 6 pages.

* cited by examiner

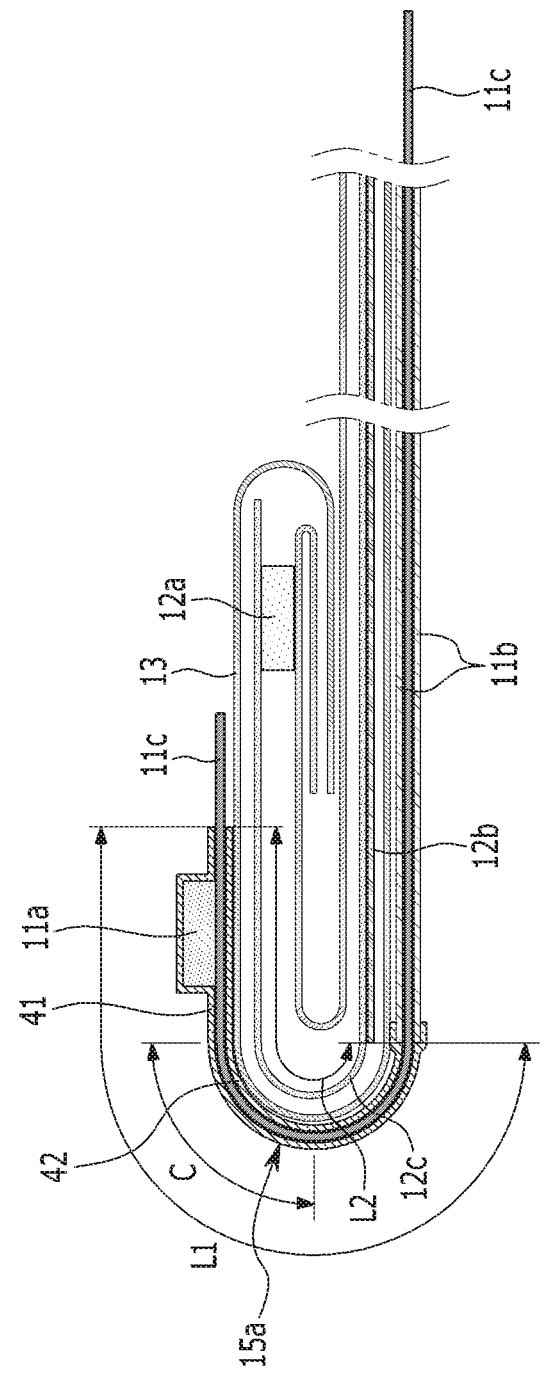

RECHARGEABLE BATTERY

CROSS-REFERENCE TO RELATED APPLICATION(S)

This application is a National Phase Patent Application of International Patent Application Number PCT/KR2017/008720, filed on Aug. 11, 2017, which claims priority of Korean Patent Application No. 10-2016-0116729, filed Sep. 9, 2016. The entire contents of both of which are incorporated herein by reference.

TECHNICAL FIELD

The present invention relates to a rechargeable battery.

BACKGROUND ART

Unlike a primary battery that cannot be recharged, a rechargeable battery is a battery that may be charged and discharged. The rechargeable battery is widely used for a small-sized portable electronic device such as a mobile phone, a notebook, or a camcorder or widely used as a power source for operating a motor of a hybrid vehicle.

The rechargeable battery has an electrode assembly that includes a positive electrode, a negative electrode, and a separator interposed between the positive electrode and the negative electrode. The electrode assembly is accommodated in a casing and charged and discharged. The casing has a terminal so as to supply or be supplied with electric currents. The casing may be made of metal or polymer.

There is an increasing need for the rechargeable battery having a high capacity, and therefore density of a positive electrode active material and density of a negative electrode active material are increased and a thickness of a plate and thicknesses of components are decreased in order to increase the capacity in a state in which an area of the electrode assembly remains the same. Further, a thickness of the separator is also decreased to a thin film level.

However, there are problems in that an internal short circuit may occur when impact is applied to the rechargeable battery from the outside, and a temperature is rapidly increased due to contact between a positive electrode plate and a negative electrode active material caused by Joule heating and shrinkage of the separator.

DISCLOSURE

Technical Problem

The present invention has been made in an effort to provide a rechargeable battery capable of preventing an internal short circuit caused by external impact.

Technical Solution

An exemplary embodiment of the present invention provides a rechargeable battery including: an electrode assembly which is wound and includes a first electrode, a second electrode, and a separator interposed between the first electrode and the second electrode; a casing which accommodates the electrode assembly; a first electrode tab which is connected to a non-coated portion of the first electrode; a second electrode tab which is connected to a non-coated portion of the second electrode; and a first insulating tape which is positioned at a winding start portion of the electrode assembly and attached to the non-coated portion of the first electrode so as to at least cover a center of a first curved portion which is curvedly formed as the electrode assembly is wound.

The first insulating tape may be attached to a coated portion of the first electrode which is coated with an active material.

The first insulating tape may be attached to cover 1 mm to 2 mm of a coated portion of the first electrode which is coated with an active material.

The non-coated portion of the first electrode may further include a second insulating tape which is attached, along the first insulating tape, to a surface opposite to the surface to which the first insulating tape is attached.

A melting point of the first insulating tape may be higher than a melting point of the separator.

The first insulating tape may be made of any one of polyamide (PA), polyimide (PI), and ceramic.

A melting point of the first insulating tape may be 200° C. or higher. A winding end portion of the electrode assembly may further include a fixing tape which is attached to the non-coated portion of the first electrode.

Advantageous Effects

According to the exemplary embodiment of the present invention, it is possible to improve safety of the rechargeable battery by preventing an internal short circuit caused by an external impact.

DESCRIPTION OF THE DRAWINGS

FIG. 6 is a view illustrating the second exemplary embodiment in which the electrode assembly illustrated in FIG. 4 is wound once.

MODE FOR INVENTION

Figure 1:
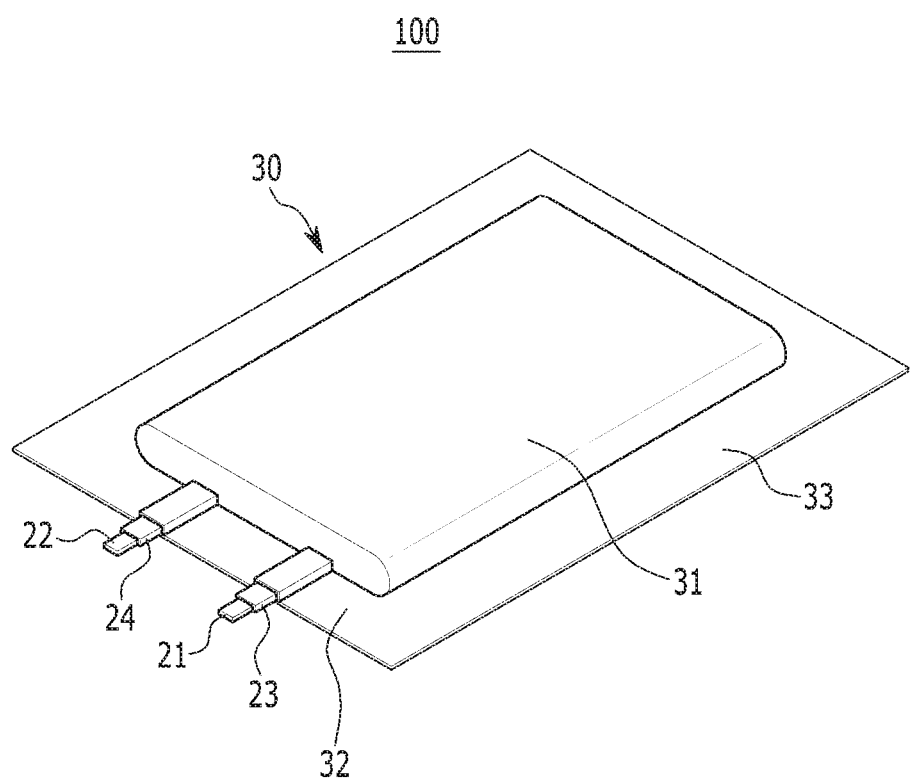
FIG. 1 is a perspective view illustrating a rechargeable battery according to an exemplary embodiment of the present invention.

Hereinafter, the present invention will be described more fully hereinafter with reference to the accompanying drawings, in which exemplary embodiments of the invention are shown. As those skilled in the art would realize, the described embodiments may be modified in various different ways, all without departing from the scope of the present invention.

A part irrelevant to the description will be omitted to clearly describe the present invention, and the same or similar constituent elements will be designated by the same reference numerals throughout the specification.

In addition, a size and a thickness of each constituent element illustrated in the drawings are arbitrarily shown for understanding and ease of description, but the present invention is not limited thereto.

In addition, unless explicitly described to the contrary, the word "comprise" and variations such as "comprises" or "comprising", will be understood to imply the inclusion of stated elements but not the exclusion of any other elements.

Figure 2:
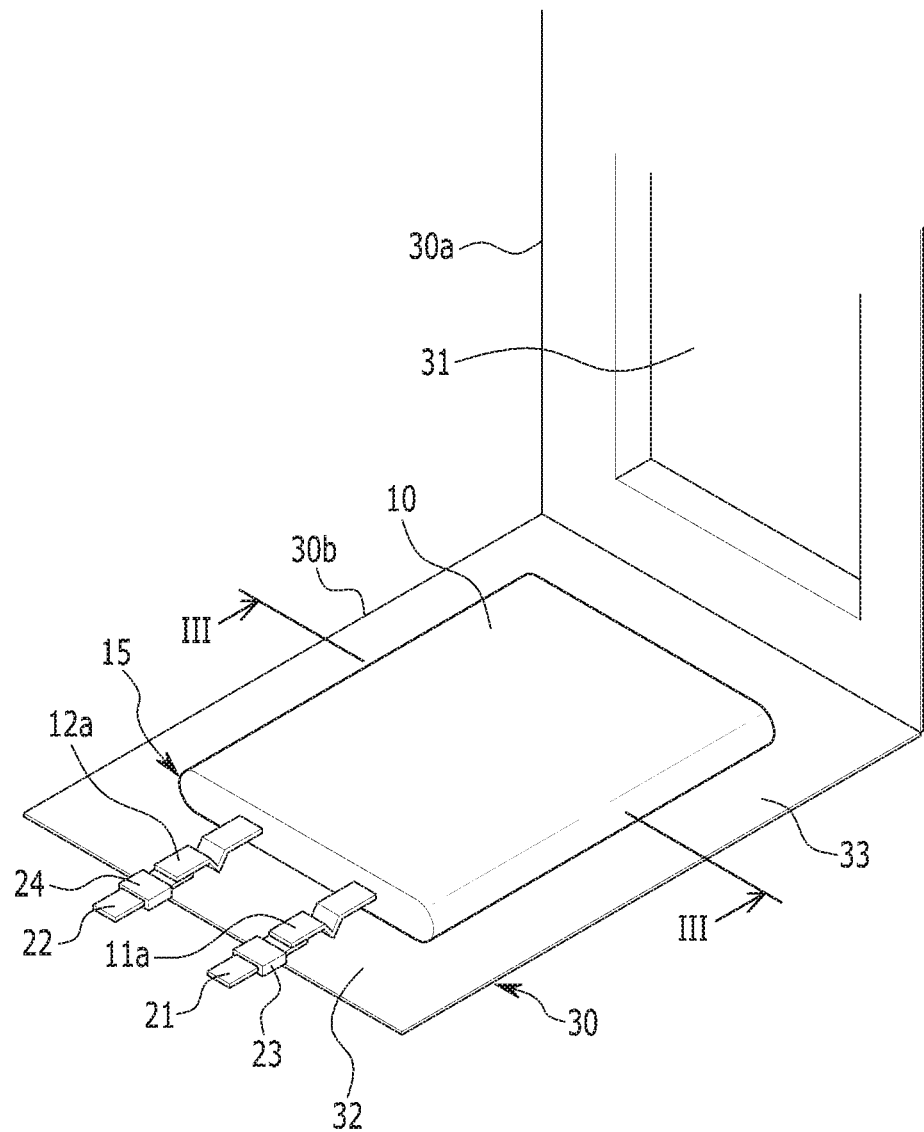
FIG. 2 is an exploded perspective view of the rechargeable battery illustrated in FIG. 1.

FIG. 1 is a perspective view illustrating a rechargeable battery according to an exemplary embodiment of the present invention, and FIG. 2 is an exploded perspective view of the rechargeable battery illustrated in FIG. 1.

Referring to FIGS. 1 and 2, a rechargeable battery 100 is disclosed. For example, the rechargeable battery according to the exemplary embodiment of the present invention may be a pouch type rechargeable battery. The pouch type rechargeable battery 100 includes an electrode assembly 10, and a pouch casing 30 that accommodates the electrode assembly 10.

The pouch casing 30 may include an accommodating portion 31, a rim joint portion 33, and an upper joint portion 32.

The pouch casing 30 may be sealed as a first plate 30a and a second plate 30b are coupled to each other. The first plate 30a and the second plate 30b of the pouch casing 30 are formed to have a multilayered sheet structure. For example, the pouch casing 30 may include a metal sheet or a polymer sheet. The polymer sheet defines an inner surface of the pouch to perform insulating and thermal bonding functions, and defines an outer surface of the pouch to perform a protecting function. As an example, the polymer sheet may be a nylon sheet, a polyethylene terephthalate (PET) sheet, or a PET-nylon composite sheet. The metal sheet provides mechanical strength and may be an aluminum sheet, for example.

The accommodating portion 31 accommodates the electrode assembly 10 and may be formed in any one of the first plate 30a and the second plate 30b of the pouch casing 30. The upper joint portion 32 may be formed at an upper end of the accommodating portion 31, and a first lead tab 21 and a second lead tab 22, which are electrically connected to the electrode assembly 10, may be extended from the upper joint portion 32. The first lead tab 21 is electrically connected to a first electrode tab 11a of the electrode assembly 10, and the second lead tab 22 is electrically connected to a second electrode tab 12a of the electrode assembly 10.

At the upper joint portion 32, the first plate 30a and the second plate 30b of the pouch casing 30 may be joined together by thermal bonding. The rim joint portion 33 is formed at a lateral side of the accommodating portion 31, and the first plate 30a and the second plate 30b may be joined together by thermal bonding at the rim joint portion 33.

At the upper joint portion 32, protective tapes 23 and 24 may be attached to the first lead tab 21 and the second lead tab 22, respectively. Therefore, it is possible to prevent a risk that the pouch casing 30 comes into contact with the first and second lead tabs 21 and 22, which causes a short circuit. The first and second lead tabs 21 and 22, to which the protective tapes 23 and 24 are attached, respectively, are positioned between the first plate 30a and the second plate 30b at the upper joint portion 32, and as a result, the upper joint portion 32 may be greater in thickness than the rim joint portion 33.

Figure 3:
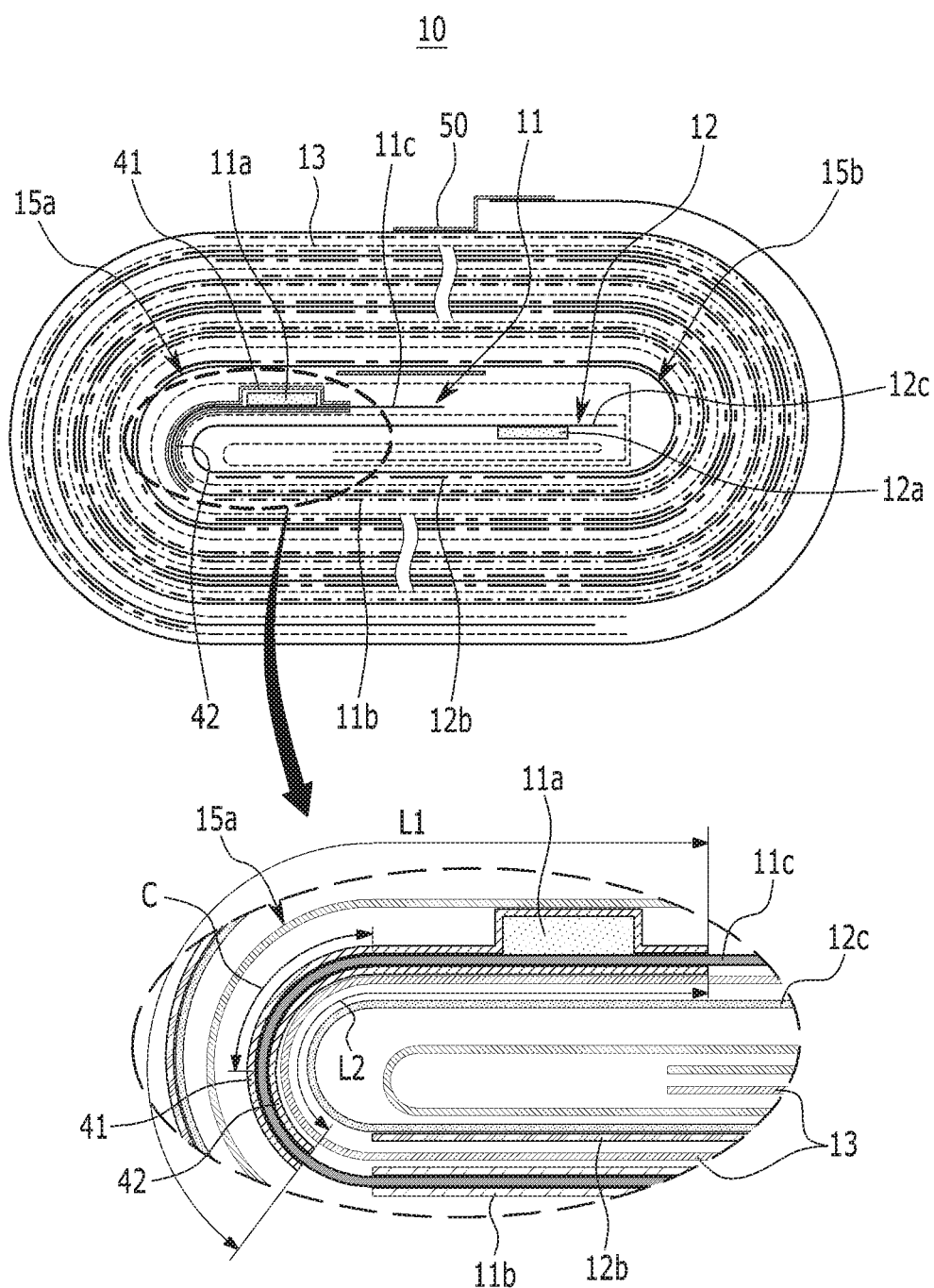
FIG. 3 is a cross-sectional view schematically illustrating a cross section of an electrode assembly according to a first exemplary embodiment.

FIG. 3 is a cross-sectional view schematically illustrating a cross section of an electrode assembly according to a first exemplary embodiment.

Referring to FIG. 3, the electrode assembly 10, which is charged with an electric current and discharged, may include a first electrode 11, a second electrode 12, and a separator 13 interposed between the first electrode 11 and the second electrode 12.

The first electrode 11 and the second electrode 12 may include, respectively, electrode plates, coated portions 11b and 12b which are formed by coating at least one surface of each of the electrode plates with an active material, non-coated portions 11c and 12c which are not coated with an active material and extend from one side of the coated portions 11b and 12b, and the first electrode tab 11a and the second electrode tab 12a which are connected to the non-coated portions 11c and 12c, respectively.

The first electrode tab 11a and the second electrode tab 12a may be electrically connected to the first lead tab 21 (see FIG. 2) and the second lead tab 22 (see FIG. 2), respectively. For example, the first electrode 11 may be a positive electrode, and the positive electrode may include the positive electrode plate which is formed as a metal thin plate having a strip shape, and the coated portion 11b which is formed by coating one surface or both surfaces of the positive electrode plate with a positive electrode active material. The positive electrode plate may be configured as a thin plate made of metal, for example, aluminum having excellent conductivity. The positive electrode active material applied onto the coated portion 11b may be a material made by mixing a binder, a conductive material, and the like with lithium-based oxide. The second electrode 12 may be a negative electrode, and the negative electrode may include a negative electrode plate which is formed as a metal thin plate having a strip shape, and the coated portion 12b which is formed by coating one surface or both surfaces of the negative electrode plate with a negative electrode active material. The negative electrode plate may be configured as a thin plate made of metal, for example, copper having excellent conductivity. The negative electrode active material applied onto the coated portion 12b may be a material made by mixing a binder, a conductive material, and the like with a negative electrode active material such as carbon.

The separator 13 may be made of a porous material. For example, the separator 13 may be made of any one of polyethylene (PE), polyethylene terephthalate (PET), and polypropylene (PP). The separator 13 may be shrunk and deformed at a temperature of 150° C. or less.

The electrode assembly 10 may be formed in the form of a jelly roll by interposing the separator 13 between the first electrode 11 and the second electrode 12, winding the electrode assembly 10 about a winding axis several times, and then pressing the electrode assembly 10 flat. The first electrode tab 11a and the second electrode tab 12a may be positioned adjacent to a winding center so as to minimize a magnetic field that occurs due to a flow of the electric current during the discharging.

The first electrode 11 includes the non-coated portion 11c that may be wound around an outer periphery of the wound electrode assembly 10 while making one or more revolutions. In addition, at the winding center, the first electrode tab 11a is connected to the non-coated portion 11c.

The second electrode 12 includes the non-coated portion 12c to which the second electrode tab 12a is connected at the winding center. In this case, at the winding center, the non-coated portion 12c of the second electrode 12 is longer than the non-coated portion 11c of the first electrode 11.

A first insulating tape 41 and a second insulating tape 42 are attached to the first electrode tab 11a so as to prevent the first electrode tab 11a from being brought into contact with the non-coated portion 12c of the second electrode 12 and the coated portion 12b of the second electrode 12. Each of the first insulating tape 41 and the second insulating tape 42 is configured as a high heat-resistant insulating tape having high heat resistance.

The high heat-resistant insulating tape may be an insulating tape that has a higher melting point than the separator 13. As an example, the melting point of the high heat-resistant insulating tape may be 200° C. or higher. The high heat-resistant insulating tape may be made of any one of organic materials such as polyimide (PI) and polyamide (PA) and inorganic materials such as ceramic.

In general, the separator 13 may begin to be shrunk and deformed at a temperature of 150° C. or less. Since the electrode assembly 10 is wound and then pressed flat as described above, the electrode assembly 10 has a curved portion 15 (see FIG. 2) curvedly formed at a lateral side of the electrode assembly 10. The curved portions 15 are formed at left and right sides of the electrode assembly 10.

The first insulating tape 41 may be attached so as to at least cover a center of a first curved portion 15a. A length L1 of the attached first insulating tape 41 is longer than a curve length C to the center of the first curved portion 15a. That is, the first insulating tape 41 is attached so as to cover the center of the curved portion which is a weak portion of the first curved portion 15a, and the length L1 of the attached first insulating tape 41 is longer than the curve length C which is a distance to the center of the curved portion. Therefore, it is possible to prevent the second electrode 12 from being short-circuited at the center of the first curved portion 15a.

The second insulating tape 42 may be attached to a surface of the electrode plate of the first electrode 11 which is opposite to the surface to which the first insulating tape 41 is attached. A length L2 of the attached second insulating tape 42 may be equal to the length of the attached first insulating tape 41.

A winding end portion of the electrode assembly 10 may further include a fixing tape 50, which is attached to the non-coated portion 11c of the first electrode 11.

Figure 4:
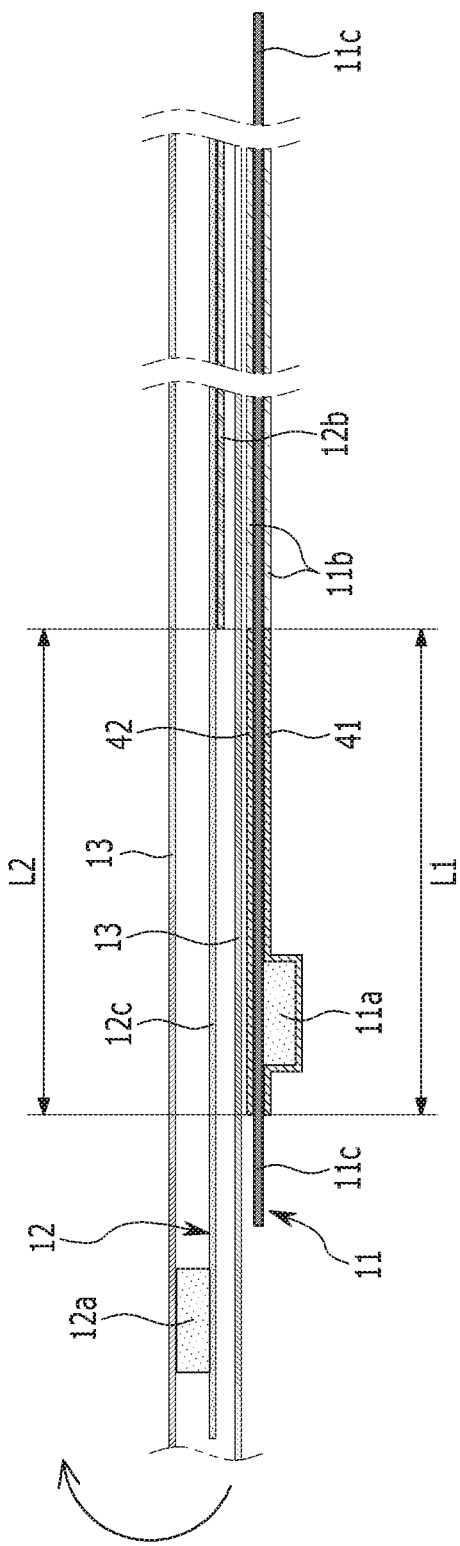
FIG. 4 is a view illustrating a state in which an electrode assembly according to a second exemplary embodiment is disassembled.
Figure 5:
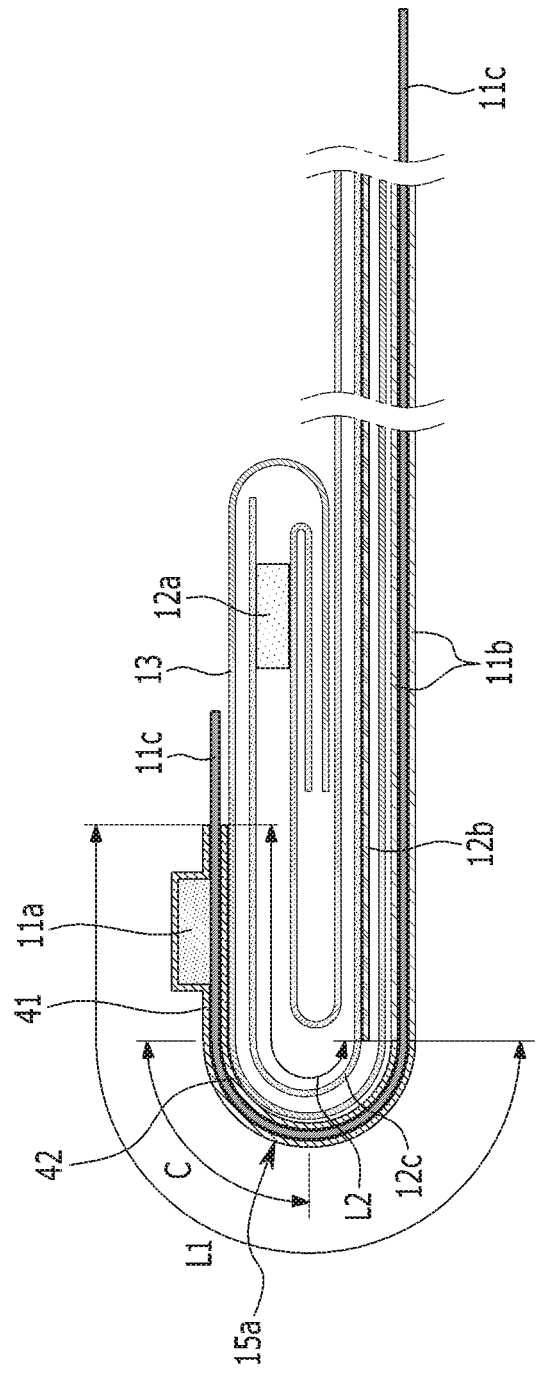
FIG. 5 is a view illustrating the first exemplary embodiment in which the electrode assembly illustrated in FIG. 4 is wound once.

FIG. 4 is a view illustrating a state in which an electrode assembly according to a second exemplary embodiment is disassembled, FIG. 5 is a view illustrating the first exemplary embodiment in which the electrode assembly illustrated in FIG. 4 is wound once, and FIG. 6 is a view illustrating the second exemplary embodiment in which the electrode assembly illustrated in FIG. 4 is wound once.

Referring to FIGS. 4 and 6, the separator 13, the second electrode 12, the separator 13, and the first electrode 11 may be stacked in this order and then wound counterclockwise so as to manufacture the electrode assembly 10.

At a winding start portion, the non-coated portion 12c of the second electrode 12 is longer than the non-coated portion 11c of the first electrode 11, and the second electrode tab 12a is connected to the non-coated portion 12c of the second electrode 12. The second electrode 12 includes the coated portion 12b which is formed by coating at least one surface of the electrode plate of the second electrode 12 with an active material. The coated portion 12b is formed on one surface of the electrode plate of the second electrode 12 and on a straight portion from the first curved portion 15a to a second curved portion 15b.

At the winding start portion, the non-coated portion 11c of the first electrode 11 is shorter than the non-coated portion 12c of the second electrode 12, and the first electrode tab 11a is connected to the non-coated portion 11c of the first electrode 11. Because of the difference in length, the first electrode tab 11a and the second electrode tab 12a may be positioned at the left and right sides based on the winding center, respectively. The first electrode tab 11a and the second electrode tab 12a may be positioned adjacent to each other in order to minimize a magnetic field occurring when discharging an electric current.

The first electrode 11 includes the coated portion 11b which is formed by coating at least one surface of the electrode plate with an active material. The coated portions 11b are formed on both surfaces of the electrode plate of the first electrode 11 and on a straight portion from the first curved portion 15a to the second curved portion 15b.

The first insulating tape 41 and the second insulating tape 42 are attached to the first electrode 11, and the first insulating tape 41 may be attached to the first electrode tab 11a and an upper surface of the non-coated portion 11c of the first electrode 11. The second insulating tape 42 may be attached to a lower surface of the non-coated portion 11c of the first electrode 11.

For example, the first insulating tape 41 may be attached to the coated portion 11b of the first electrode 11 which is coated with the active material. In addition, the second insulating tape 42 may be attached to the coated portion 11b of the first electrode 11 which is coated with the active material. As another example, the first insulating tape 41 may be attached to cover about 1 mm to about 2 mm of the coated portion 11b of the first electrode 11 which is coated with the active material. In addition, the second insulating tape 42 may be attached to cover about 1 mm to about 2 mm of the coated portion 12b of the first electrode 12 which is coated with the active material.

There is a great risk that the center of the curved portion 15, which is formed curvedly as the electrode assembly is wound, will be short-circuited due to contact between the first electrode 11 and the second electrode 12 even by a small external impact. Therefore, the insulating tape may be attached to the coated portion 11b while covering the first curved portion 15a.

In addition, the first insulating tape 41 is attached to the first electrode tab 11a. The reason is that there is a great risk that similar to the center of the curved portion 15, the first electrode tab 11a will be short-circuited by being brought into contact with the second electrode 12 even by a small external impact because the first electrode tab 11a is connected to the non-coated portion 11c of the first electrode 11 and protrudes from the non-coated portion 11c of the first electrode 11. The first insulating tape 41 prevents the non-coated portion 11c of the first electrode 11 from being exposed in a direction toward the second electrode 12 at the winding start portion, thereby preventing a short circuit that may occur due to an external impact.

While the present invention has been described with reference to the aforementioned exemplary embodiments, the person skilled in the art will easily understand that the present invention is not limited to the disclosed exemplary embodiments, but can be variously corrected and modified without departing from the scope of the appended claims.

<Description of symbols>

| | |
|---|---|
| 100: Rechargeable battery | 10: Electrode assembly |
| 11: First electrode | 12: Second electrode |
| 11a: First electrode tab | 11b, 12b: Coated portion |
| 12a: Second electrode tab | 11c, 12c: Non-coated portion |
| 13: Separator | 15: Curved portion |
| 15a: First curved portion | 15b: Second curved portion |
| 21: First lead tab | |
| 22: Second lead tab | 23, 24: Protective tape |
| 30: Pouch casing | 30a: First plate |
| 30b: Second plate | 31: Accommodating portion |
| 32: Upper joint portion | 33: Rim joint portion |

| <Description of symbols> | |
|---|---|
| 41: First insulating tape | 42: Second insulating tape |
| 50: Fixing tape | |
| L1: Length of attached first insulating tape | C: Curve length |
| L2: Length of attached second insulating tape | |

The invention claimed is:

1. A rechargeable battery comprising:
an electrode assembly which is wound and comprises a first electrode, a second electrode, and a separator between the first electrode and the second electrode;
a casing which accommodates the electrode assembly;
a first electrode tab connected to a non-coated portion of the first electrode;
a second electrode tab connected to a non-coated portion of the second electrode on a side surface of the non-coated portion of the second electrode facing a center of the electrode assembly; and
a first insulating tape positioned at a winding start portion of the electrode assembly and attached to the non-coated portion of the first electrode so as to at least cover a center of a first curved portion which is curvedly formed as the electrode assembly is wound,
wherein the winding start portion comprises a length of the non-coated portion of the first electrode at which the first insulating tape is not attached prior to a second length of the non-coated portion of the first electrode at which the first insulating tape is attached;
wherein, at the winding start portion, a non-coated end of the second electrode is longer than a non-coated end of the first electrode and the non-coated end of the second electrode and the non-coated end of the first electrode face the same direction;
wherein a melting point of the first insulating tape is higher than a melting point of the separator; and
wherein the first insulating tape is adhered to the non-coated portion of the first electrode and not adhered to the separator.

2. The rechargeable battery of claim 1, wherein:
the first insulating tape is attached to a coated portion of the first electrode which is coated with an active material.

3. The rechargeable battery of claim 1, wherein:
the first insulating tape is attached to cover 1 mm to 2 mm of a coated portion of the first electrode which is coated with an active material.

4. The rechargeable battery of claim 1, wherein:
the non-coated portion of the first electrode further comprises a second insulating tape which is attached, along the first insulating tape, to a surface opposite to a surface to which the first insulating tape is attached.

5. The rechargeable battery of claim 1, wherein:
the first insulating tape is made of any one of polyamide (PA), polyimide (PI), and ceramic.

6. The rechargeable battery of claim 1, wherein:
the melting point of the first insulating tape is 200° C. or higher.

7. The rechargeable battery of claim 1, wherein:
a winding end portion of the electrode assembly further comprises a fixing tape which is attached to the non-coated portion of the first electrode.

8. A rechargeable battery comprising:
an electrode assembly which is wound and comprises a first electrode, a second electrode, and a separator between the first electrode and the second electrode;
a casing which accommodates the electrode assembly;
a first electrode tab connected to a non-coated portion of the first electrode;
a second electrode tab connected to a non-coated portion of the second electrode; and
a first insulating tape positioned at a winding start portion of the electrode assembly and attached to the non-coated portion of the first electrode so as to at least cover a center of a first curved portion which is curvedly formed as the electrode assembly is wound,
wherein the winding start portion comprises a length of the non-coated portion of the first electrode at which the first insulating tape is not attached prior to a second length of the non-coated portion of the first electrode at which the first insulating tape is attached;
wherein, at the winding start portion, a non-coated end of the second electrode is longer than a non-coated end of the first electrode and the non-coated end of the second electrode and the non-coated end of the first electrode face the same direction:
wherein a melting point of the first insulating tape is higher than a melting point of the separator; and
wherein the first insulating tape is adhered to the non-coated portion of the first electrode and not adhered to the separator; and
wherein the side surface of the non-coated portion of the second electrode at which the second electrode tab is located faces an opposite direction to a side surface of the non-coated portion of the first electrode at which the first electrode tab is located.

9. A rechargeable battery comprising:
an electrode assembly which is wound and comprises a first electrode, a second electrode, and a separator between the first electrode and the second electrode;
a casing which accommodates the electrode assembly;
a first electrode tab connected to a non-coated portion of the first electrode;
a second electrode tab connected to a non-coated portion of the second electrode; and
a first insulating tape positioned at a winding start portion of the electrode assembly and attached to the non-coated portion of the first electrode so as to at least cover a center of a first curved portion which is curvedly formed as the electrode assembly is wound,
wherein the winding start portion comprises a length of the non-coated portion of the first electrode at which the first insulating tape is not attached prior to a second length of the non-coated portion of the first electrode at which the first insulating tape is attached;
wherein, at the winding start portion, a non-coated end of the second electrode is longer than a non-coated end of the first electrode and the non-coated end of the second electrode and the non-coated end of the first electrode face the same direction;
wherein a melting point of the first insulating tape is higher than a melting point of the separator; and
wherein the first insulating tape is adhered to the non-coated portion of the first electrode and not adhered to the separator; and
wherein at the winding start portion, a portion of the separator that extends past the non-coated portion of the second electrode overlaps the first electrode tab and the second electrode tab in a thickness direction of the electrode assembly.

\* \* \* \* \*

UNITED STATES PATENT AND TRADEMARK OFFICE
CERTIFICATE OF CORRECTION

PATENT NO. : 12,148,874 B2
APPLICATION NO. : 16/329409
DATED : November 19, 2024
INVENTOR(S) : Byongchul Woo et al.

It is certified that error appears in the above-identified patent and that said Letters Patent is hereby corrected as shown below:

In the Claims

In Column 8, Line 25, in Claim 8, delete "direction:" insert -- direction; --.

Signed and Sealed this
Eighth Day of April, 2025

Coke Morgan Stewart
*Acting Director of the United States Patent and Trademark Office*